No. 607,647. Patented July 19, 1898.
J. V. RICE, Jr.
ENGINE GOVERNOR.
(Application filed Apr. 27, 1895. Renewed Jan. 25, 1898.)

(No Model.) 6 Sheets—Sheet 1.

No. 607,647. Patented July 19, 1898.
J. V. RICE, JR.
ENGINE GOVERNOR.
(Application filed Apr. 27, 1895. Renewed Jan. 25, 1898.)
(No Model.) 6 Sheets—Sheet 2.
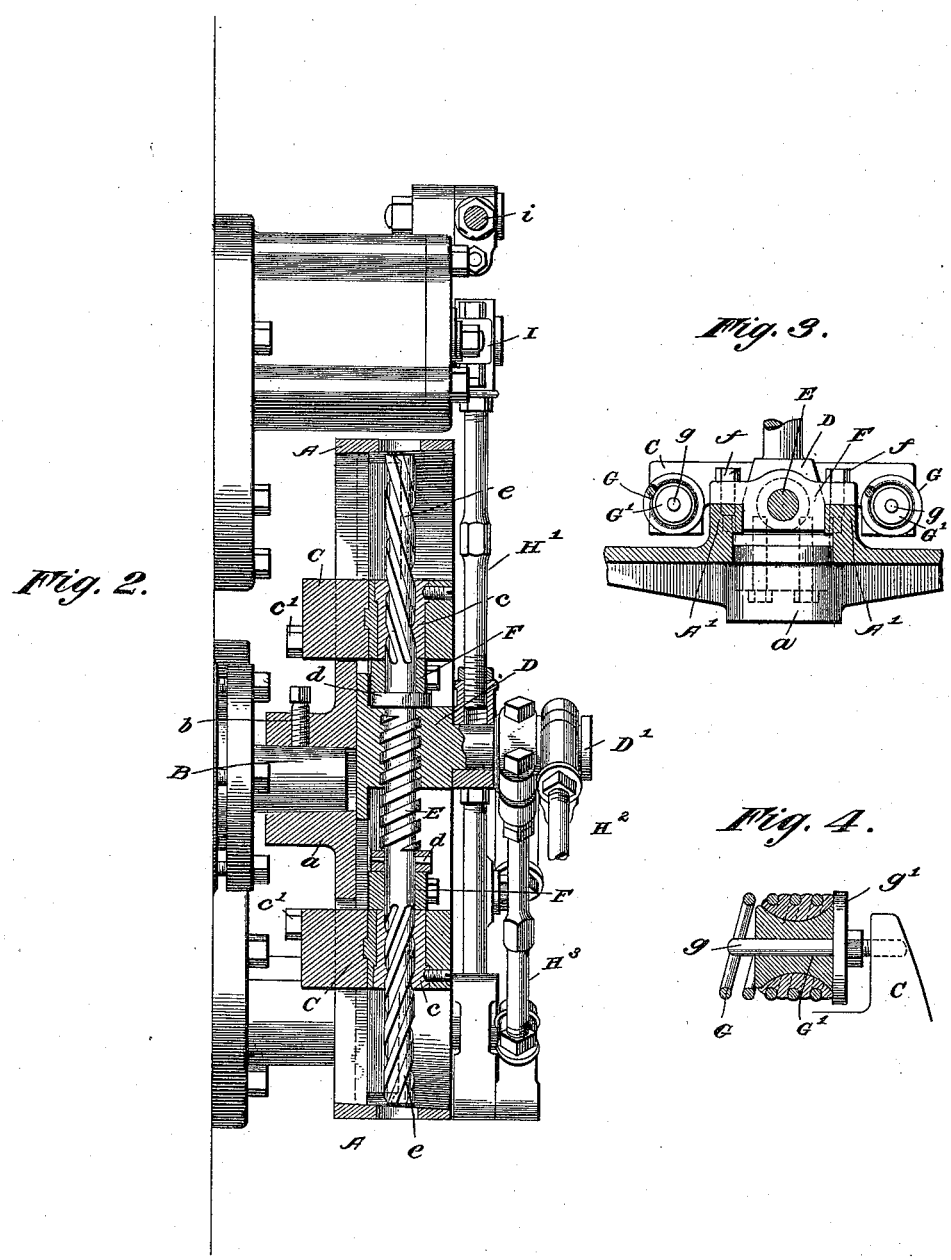

No. 607,647. Patented July 19, 1898.
J. V. RICE, Jr.
ENGINE GOVERNOR.
(Application filed Apr. 27, 1895. Renewed Jan. 25, 1898.)
(No Model.) 6 Sheets—Sheet 3.
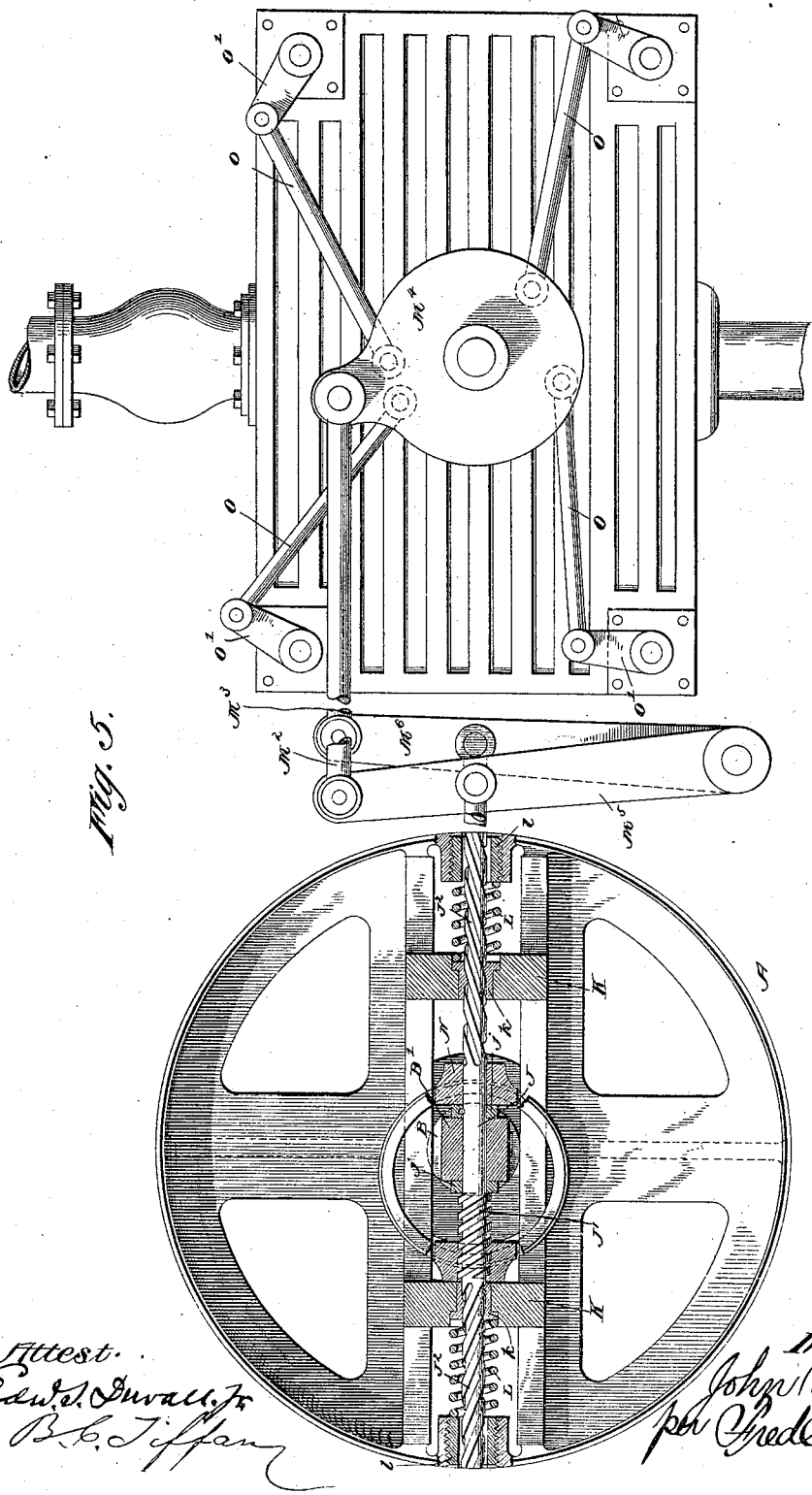

No. 607,647. Patented July 19, 1898.
J. V. RICE, Jr.
ENGINE GOVERNOR.
(Application filed Apr. 27, 1895. Renewed Jan. 25, 1898.)
(No Model.) 6 Sheets—Sheet 4.
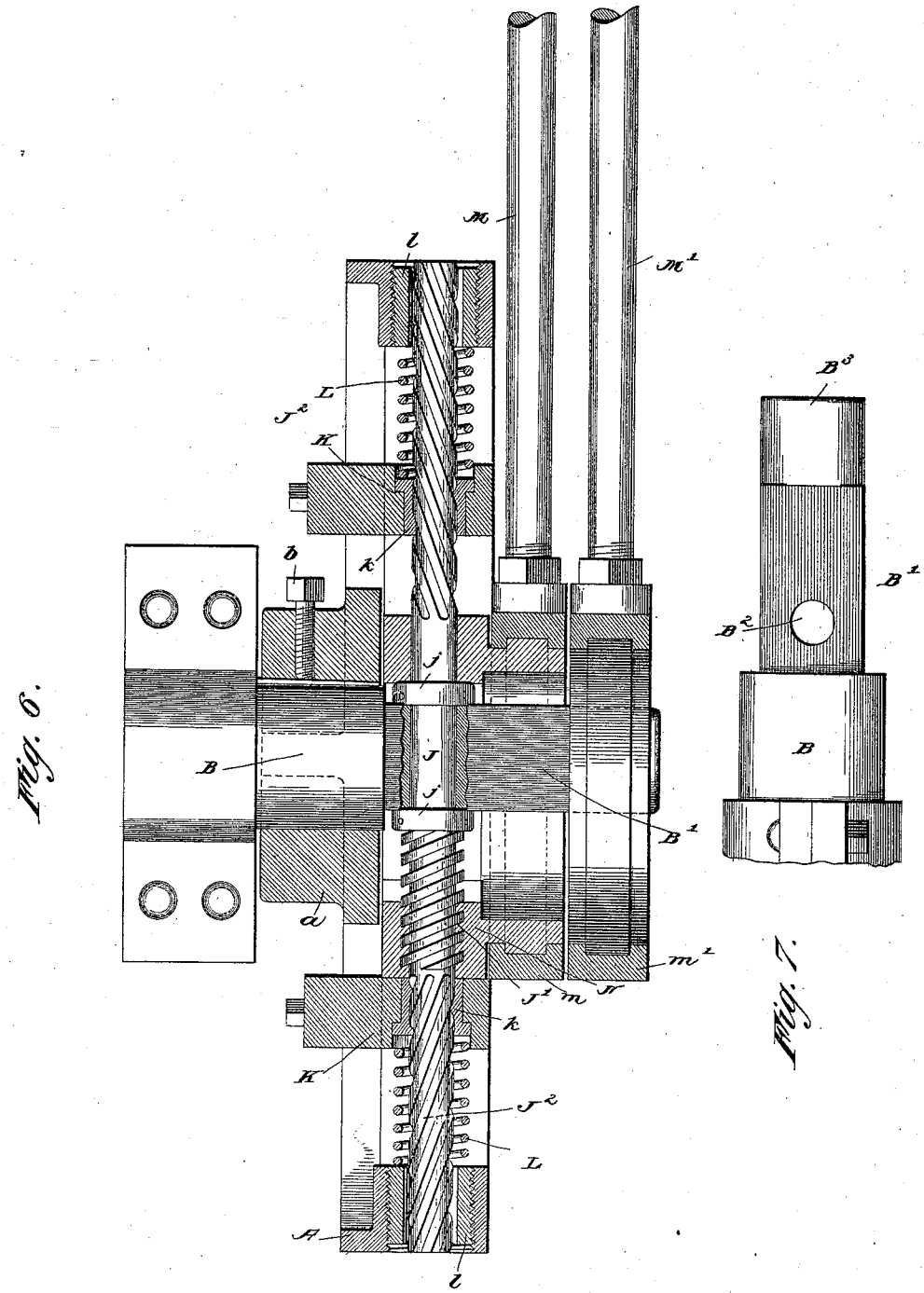

No. 607,647. Patented July 19, 1898.
J. V. RICE, Jr.
ENGINE GOVERNOR.
(Application filed Apr. 27, 1895. Renewed Jan. 25, 1898.)

(No Model.) 6 Sheets—Sheet 5.

Witnesses
Inventor
John V. Rice Jr.
per Fred E. Tasker
Attorney

No. 607,647.  
J. V. RICE, Jr.  
ENGINE GOVERNOR.  
(Application filed Apr. 27, 1895. Renewed Jan. 25, 1898.)

Patented July 19, 1898.

(No Model.)

6 Sheets—Sheet 6.

Attest.  
Edw. G. Duvall Jr.  
B. S. Tiffany

Inventor:  
John V. Rice Jr.  
per Fred G. Fisker,  
Atty.

THE NORRIS PETERS CO., PHOTO-LITHO., WASHINGTON, D. C.

UNITED STATES PATENT OFFICE.

JOHN V. RICE, JR., OF EDGEWATER PARK, NEW JERSEY, ASSIGNOR TO THE JOHN V. RICE, JR., COMPANY, OF SAME PLACE.

ENGINE-GOVERNOR.

SPECIFICATION forming part of Letters Patent No. 607,647, dated July 19, 1898.

Application filed April 27, 1895. Renewed January 25, 1898. Serial No. 667,940. (No model.)

*To all whom it may concern:*

Be it known that I, JOHN V. RICE, Jr., a citizen of the United States, residing at Edgewater Park, in the county of Burlington and State of New Jersey, have invented certain new and useful Improvements in Engine-Governors; and I do hereby declare the following to be a full, clear, and exact description of the invention, such as will enable others skilled in the art to which it appertains to make and use the same.

This invention relates to an improvement in steam-engine and other governors, the object of the invention being to provide a simple, easily-constructed, and effectively-operating governing mechanism for use with engines of different kinds; and the invention therefore consists, essentially, in the construction, arrangement, and combination of parts, substantially as will be hereinafter described and then more particularly claimed.

Figure 1:
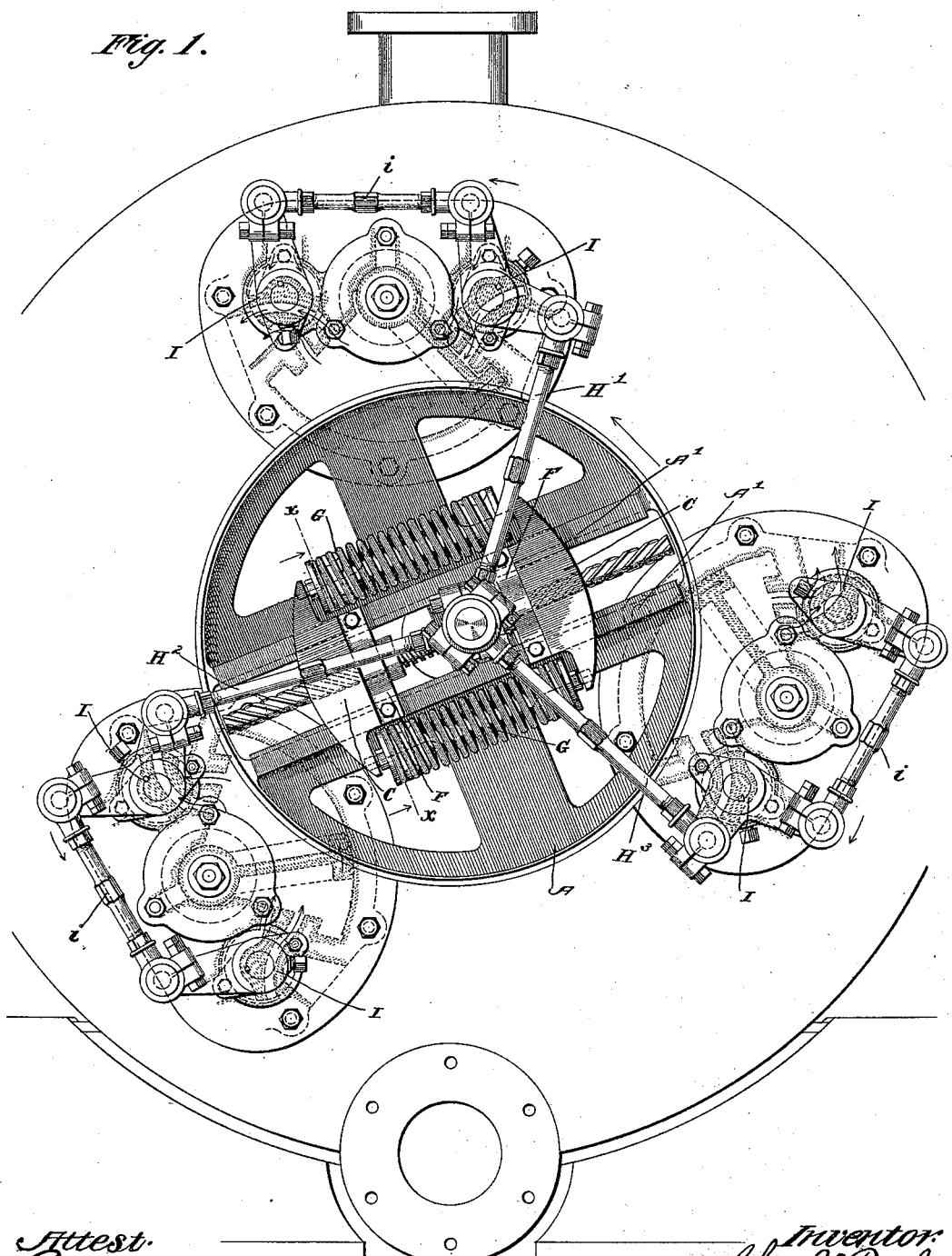
Figure 8:
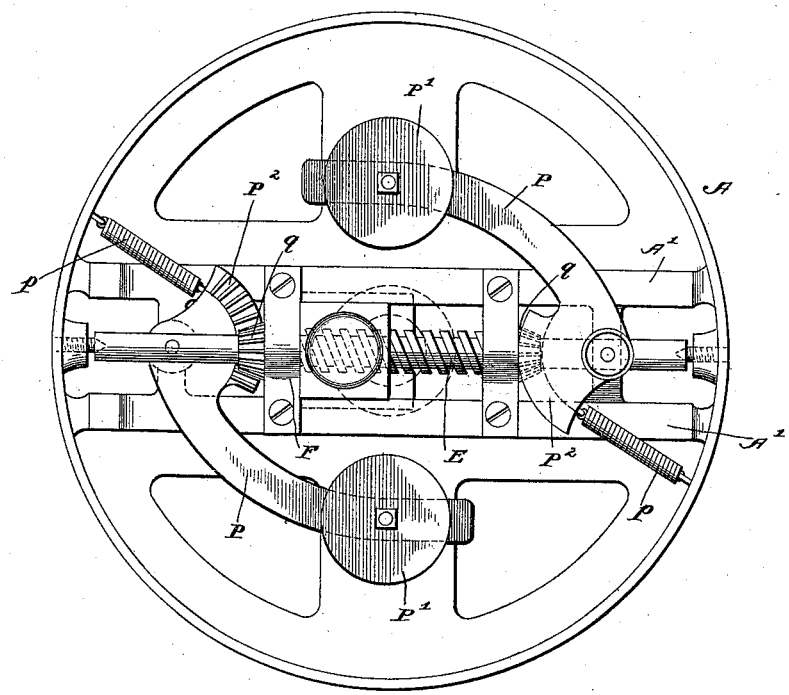
Figure 9:
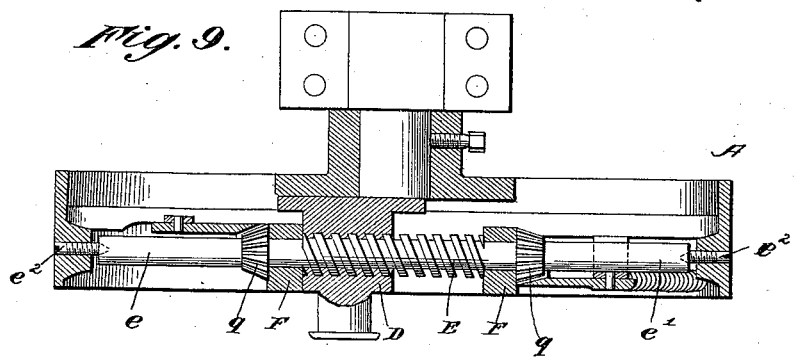
Figure 10:
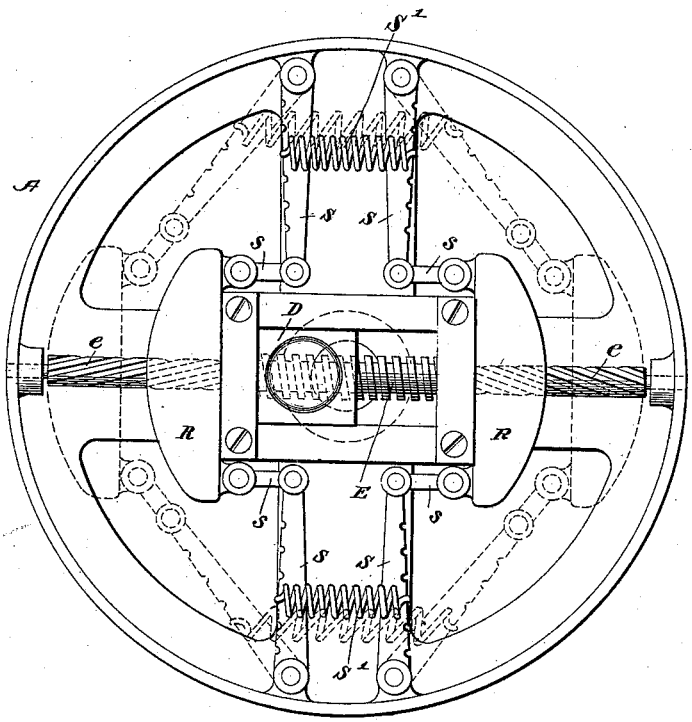
Figure 11:
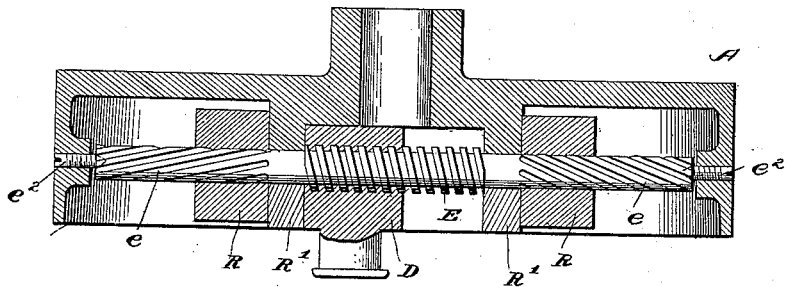

In the annexed drawings, illustrating my invention, Figure 1 is a front elevation of my improved steam-engine governor, the same being represented as practically applied to an engine of the type commonly known as a "triple-sector-cylinder" engine. Fig. 2 is a longitudinal sectional elevational view of my improved governor mechanism. Fig. 3 is a transverse cross-sectional elevation on the line $x\ x$ of Fig. 1. Fig. 4 is an enlarged detail view showing the manner of fastening the ends of the spiral springs to the movable weights. Fig. 5 is a side elevation of my improved governor arranged in connection with a Corliss engine, several of the mechanical parts being shown in section and the construction of the governor being modified sufficiently to adapt it for use with the Corliss type. Fig. 6 is an enlarged horizontal sectional plan view of the governor mechanism shown in Fig. 5. Fig. 7 is a detail side view of the main engine-shaft shown in Fig. 6, but viewed at right angles to the view in Fig. 6. Fig. 8 is a front elevation of a modified form of my improved governor. Fig. 9 is a horizontal sectional plan view of the same. Fig. 10 is a front elevation of a still further modified form of my improved governor. Fig. 11 is a horizontal sectional plan view of the same.

Similar letters of reference designate corresponding parts throughout all the different figures of the drawings.

In Figs. 1 and 2 I have represented my improved governor as practically applied for use with a steam-engine of the character described and claimed in my former Letters Patent Nos. 536,392 and 536,393, dated March 26, 1895, said engine consisting, essentially, of a multiple arrangement of three or more sector-cylinders around a common shaft, whereby the stoppage of the shaft on a deadcenter is effectually avoided and a very much higher speed and a larger efficiency are attained than is possible with a single oscillating piston or sector cylinder. I do not wish, however, of course, to be confined in the use of my improved governor to this particular type of engine, and I have shown the latter in the drawings simply for the purpose of illustration and to emphasize the fact that I consider my present governor as an extremely valuable device for use with the improved steam-engine just referred to.

A designates the governor-wheel, which may be of any suitable and desirable form— as, for instance, the form shown in the figures of the drawings—where it consists of a circular or cylindrical casting of skeleton shape having a central hub $a$, which is fastened upon the main engine-shaft B by means of a set-screw $b$ or some other suitable device. The governor-wheel A is constructed with two parallel transverse guideways or bars A' A', on which move the centrifugally-acting weights, the operation of which in effecting the variation of the steam-supply will be presently described in greater detail. C C denote these weights. I do not wish to be restricted to any particular shape or size therefor. They are made in such a manner as to easily slide upon the guides A', moving back and forth toward and away from the peripheral rim of the wheel. In Fig. 1 the weights C are shown in their location upon the guides A'. In Fig. 3 a more detailed view of the connection of the weights with the guides A' is represented. These centrifugally-acting weights C C are connected together at their ends by means of the parallel coiled springs G G, which are attached to the weights in any suitable manner. In Fig. 4 I have represented an enlarged sectional detail view showing the preferred way of securing the springs to the weights.

G' denotes a block with a concave surface and having a collar or disk g' at one end. A pin or rod g passes through the block G' and is screw-threaded at one end for the purpose of being screwed into the end of weight C, as shown in Fig. 4. The spring G envelops the concave-faced block G', and a mass of soft metal is poured around the coils of the spring and in between them and the concave face of the said block in order that the spring may thereby be bound firmly to the block when the soft metal hardens, and thus a firm and tight connection of the spring with the block be made. The block being firmly attached by the rod g to the weight, it will be evident that I hereby afford an effective and beneficial attachment for the spring to the weight, said attachment being of such a character that the spring is free to act expansively during the operation of the governor. I do not wish to be restricted to this particular method of attaching the spring to the weights, but present it here simply as an example and reserve the liberty of using any attaching device which may seem appropriate.

F F denote transverse bars or tie-strips which are securely bolted or otherwise fastened to the parallel guideways A' A' at equal distances from the center of wheel A, as shown in Fig. 1. These cross-pieces furnish bearings for a central screw-shaft which is situated midway between the guides A' and parallel thereto. On this screw-shaft, between the cross-bars F, are placed collars d d. These collars may be made integral with the screw-shaft or may be secured thereto by means of a pin, as shown in Fig. 3. Said collars are in contact with the cross-bars F and have the function of keeping the screw-shaft in position endwise. The section of the screw-shaft between the collars d d is represented by the reference-letter E and has preferably a somewhat gradual pitch, as shown. The ends of the screw-shaft beyond the cross-pieces F F are represented by the reference-letters e e and are formed with threads having a different pitch from the section E. The threads of the sections e e are longer and hence are sharper than the threads of the section E, so that a nut on one of the sections e will move farther than a nut on the section E during the same rotation of the shaft. The sections e e of the screw-shaft pass centrally through the weights C C, which latter are provided with screw-threaded bores which engage as nuts the said screw-shaft. I preferably insert separable blocks or nuts c into the central portions of the weights C C for the purpose of receiving the screw-shaft, as shown in Fig. 2. It may also be here stated that the weights C C themselves are preferably made in two parts, the upper part resting upon the ways A' A', as shown in Fig. 3, and the lower part being bolted to the upper part by means of the bolts c' c', as shown in Figs. 2 and 3, said lower parts of the weights being beneath the guides A', but being fastened up closely to the upper portions of the weights, so that in this manner the weight is, as it were, fashioned with grooves which engage the ways A' as ribs or flanges, and thus enable the weights to slide nicely along the guideways.

D designates a block situated on the central section E of the screw-shaft between the collars d d and adapted to travel back and forth between the collars accordingly as the screw-shaft revolves in one direction or the other. This block slides upon the rear inner face of the governor-wheel A. The outer end of the block D is fashioned with a pin D'. To this pin or "crank," as it may be termed, are properly attached the connecting-rods H', H², and H³, which extend to the valves I of the engine. In the case of the triple-sector-cylinder engine shown in Fig. 1, where each sector-cylinder has a pair of valves I I of the plug form provided with cranks which are connected by the links i i, it will of course be found necessary to have three of these connecting-rods H' H² H³, as already stated, which may extend to the several cylinders. In the case of engines of a different type, however, it may not be necessary to have three connecting-rods, but one, or perhaps two, may suffice, and presumably my invention will include such appropriate connecting devices as may be necessary to connect the movable block D with the appropriate valve or valves which the governor mechanism is designed to control. I do not wish, therefore, to be confined to any special arrangement of valve devices or of connecting means, but reserve the liberty of broadly using the block D in connection with the valves, as may be found necessary.

It will be evident that during the operation of the engine as the engine-shaft B rapidly rotates the governor-wheel A, which is attached thereto, will likewise rapidly rotate, and the result of its rapid motion will be to cause the governor-weights C C to act centrifugally or, in other words, to move outward from the center of the governor-wheel toward the periphery thereof, in such movement expanding, of course, the coiled springs G G. The outward movement of the weights C C will also cause the screw-shaft to be revolved, and this will cause the block D to be moved a greater or less extent upon the central section E, and the result of this movement will be to operate the connecting rod or rods and shift the valve sufficiently to effect the proper variation of the cut-off as may be required to regulate the movement of the engine. As the speed of the engine slows down in consequence of the diminution of the steam-supply thus brought about the centrifugal force, acting on the weights C C, will be overcome by the tension of the centripetally-acting springs G G, and hence the weights C will be drawn back into their normal position against the cross-bars F F.

In Figs. 5, 6, and 7 I have shown a slight modification of my steam-engine governor to adapt it for use more particularly with an engine of the Corliss type. An engine of this kind is partly represented in Fig. 5. The style of engine denominated "Corliss" is so distinctive in the art and is so well known that a detailed explanation thereof is unnecessary here. It is so extensively used, moreover, that a modification of my improved governor for a special use therewith seems to be justified. It may be stated that in the Corliss engine there are two inlet and two exhaust valves which are segmental and which vibrate each on its own spindle within a bored cylindrical seat. These valves are moved independently by rods O, four of which are shown in Fig. 5, said rods being connected with the crank-arms $o'$, attached to the valves, and said rods being also actuated from a vibrating disk $M^4$, to which they are pivoted, which disk is operated by an eccentric-rod. Usually there will be two of these disks in order to accomplish the best manipulation of the valves. $M^2$ and $M^3$ designate rods connected to these disks. Said rods are pivoted to the upper ends of the arms $M^5$ and $M^6$, and to these arms are pivotally attached the rods M and $M'$, (shown in Fig. 6,) which are operated by the eccentrics, as I shall presently explain. In further explanation of the Corliss engine it may be said that the mechanism which opens the valves is thrown out of gear during every stroke of the engine. When this disconnection takes place, the valve will be instantaneously closed by a yielding device which is cushioned by a small piston closing on compressed air.

Referring now to Fig. 6, it will be seen that the governor wheel or casing A is secured upon the engine-shaft B by means of the set-screw $b$ in like manner as in Figs. 1 and 2. The engine-shaft in Figs. 6 and 7 is shaped somewhat differently from the ordinary. Its outer end is extended to form the flat portion $B'$, beyond which, at the extreme end of the shaft, is a round portion $B^3$. The flat part $B'$ is provided with a transverse opening $B^2$. The screw-shaft of the governor in this modification is quite similar to that shown in Figs. 1 and 2, although there are some important differences. The middle section of the shaft is represented by the reference-letter J and is smooth, and this section passes through the transverse opening $B^2$ in the flat part $B'$ of the shaft, there being collars $j\ j$ on the screw-shaft at each side of the part $B'$, and consequently at each end of the smooth middle portion J. Each end of the screw-shaft is provided with threads $J^2$, similar to the threads $e\ e$, (shown in Figs. 1 and 2,) and between one of these threaded portions $J^2$ and one of the collars $j$ is a threaded part $J'$, similar to the threaded section E. (Shown in Figs. 1 and 2.) Thus it will be seen that the screw-shaft is substantially the same, with a slight variation in the arrangement of its threads, but having practically the same design and function and operating in about the same way as before. On this screw-shaft is a hollow block N, having two bearings on the shaft, one of which is at one side of the engine-shaft and the other is at the other side thereof, and one of these bearings being internally screw-threaded to engage the middle threaded section $J'$ in like manner as the block D engages the threaded portion E in Fig. 2. The hollow block N is located eccentrically to the axis of the engine-shaft and is shaped cylindrically, so that the eccentric-ring $m$ may be mounted thereon, as is clearly shown in Fig. 6, said eccentric-ring being connected with the rod M and said ring being internally grooved, as shown, to receive an exterior rib or flange on the block N, in order that an efficient loose connection may be made between the eccentric-ring and the block for the purpose of permitting the block to rotate easily within said ring, the effect of which rotation will be to oscillate the connecting-rod in the proper manner. Also it will be seen that there is another eccentric-ring $m'$ attached to the eccentric-rod $M'$, the ring $m'$ being situated upon the round end $B^3$ of the shaft. Thus while the rod $M'$ will be acted upon by the eccentric connection with the engine-shaft, said eccentric connection will not be variable, like the connection with the rod M, since the eccentric will not change its position as will the eccentric-block N, which, as we have seen, having substantially the same function and operation as the block D, will travel a greater or less extent upon the screw-shaft under the impulse which will be given thereto by the centrifugally-acting weights. It is to be understood, of course, that in the modification shown in Fig. 6 I employ weights of substantially the same kind as those shown in Figs. 1 and 2. The weights in Fig. 6 are designated by the reference-letters K K. These weights have the inserted nuts $k$. In the outer peripheral rim of the governor-wheel A are inserted screw-threaded sleeves $l\ l$, which are hollow and which receive the outer ends of the screw-shaft. These outer screw-threaded portions $J^2\ J^2$ of the screw-shaft are surrounded by springs L L, which are tensioned between the nuts $k\ k$ and the screw-threaded sleeves $l\ l$. Obviously the springs L will be placed upon the screw-shaft by passing them through the openings in the rim of wheel A and then inserting the screw-threaded sleeves $l$, which will not only hold the springs L in place, but by bearing against them and being adjustable thereon will be efficient to regulate the tension of said springs. These springs serve the same purpose as the springs G G in Figs. 1 and 2. They operate to press the weights inwardly or toward the center of the governor-wheel. They therefore act centripetally. When the weights K K have been thrown outward in consequence of the too-rapid motion of the engine-shaft, these springs L L will be compressed, and when the speed of the shaft slows down again to a normal rate these springs will act to restore the weights K to their normal position again. The action of the governor mechanism shown in Figs. 5, 6, and 7 will be readily understood from this description. It will be seen that as the weights K act centrifugally the screw-shaft will be rotated and the position of the eccentric-block N varied sufficiently to change the cut-off, so as to properly regulate the steam-supply and keep the engine at a normal safe speed.

Referring now to Figs. 8 and 9, it will be seen that I have shown therein a still further modification of certain of the parts of my improved governor. The governor-wheel is substantially the same, and it is supported upon the engine-shaft in substantially the same manner as in the other examples. The screw-shaft is varied, however, to some extent. It consists of the central screw-threaded section E, whose threads are of short pitch, similar to what is shown in Figs. 1 and 2. Instead, however, of having the end portions screw-threaded, as at $e\,e$, said end portions are made smooth, as at $e'\,e'$. (See Fig. 9.) The ends of the screw-shaft are supported by the pointed screws $e^2\,e^2$, which project through the rim of wheel A and enter small recesses in the ends of the shaft. The screw-shaft is supported also in bearings in the cross-bars F F, bolted to the parallel guideway A' A' in like manner as in Figs. 1 and 2. On the smooth portions $e'\,e'$ of the screw-shaft are secured beveled pinions $q\,q$. These pinions engage segmental racks $P^2\,P^2$, which are pivoted to wheel A, or, rather, to certain connections between the parallel ways A', as shown in Fig. 8. Integral with the segmental racks $P^2$ are the arms P, which carry the weights P'. Springs $p\,p$ are attached to the racks $P^2$ and to the rim of wheel A. Here we have an arrangement of weights or balls adapted to act centrifugally when the speed of the engine permits. The outward movement of these weights P' P' will result, obviously through the gearing connection, in rotating the shaft and in causing the block D, which is placed upon the screw-section E in like manner as in Figs. 1 and 2, to travel sufficiently upon said section to adjust the position of the valves with which it may be connected and thereby properly regulate the cut-off.

Referring now to Figs. 10 and 11, it will be seen that I have delineated an additional example or modification of my improved governor, the same comprising a governor-wheel A, as before, which is properly mounted upon the engine-shaft. The screw-shaft is found here as in the other examples and partakes of the form shown in Figs. 1 and 2, having the central section E of small pitch and the end sections $e\,e$ of larger pitch, and in this example I find it convenient, as I did in the example shown in Figs. 8 and 9, to support the screw-shaft not only in the transverse connections R' R', which are made integral with wheel A, but also to sustain the ends of the shaft by means of the pointed screws $e^3\,e^3$ passing through the rim of the wheel A. On the screw-threaded end portions $e\,e$ of the screw-shaft are the weights R R, adapted to travel back and forth upon said shaft in like manner as the weights C C travel back and forth in Figs. 1 and 2. Pivoted to the wheel A at points on the periphery opposite to the center of the wheel and equidistant from the central screw-shaft are two pairs of levers S S. The inner ends of these levers connect by means of short links $s\,s$ with the ends of the weights R R, the connection in each instance being a pivotal one. Levers S S are connected together by means of springs S' S', which may be adjusted lengthwise upon said levers, the levers having on their edges a series of notches to permit the engagement of the springs therewith when being adjusted. The position of the said levers, weights, and other parts when the engine is running normally is shown in full lines in Fig. 10. Their position when the weights have been moved outward from their normal position is shown in dotted lines in the same figure. When the engine runs too fast, it will be obvious that the weights R R will act centrifugally and move outward, thereby drawing the levers S S into the inclined position shown and likewise expanding the springs S'. The simultaneous revolution of the screw-shaft moves the block D and automatically varies the cut-off, as I have already explained in connection with the other forms of my invention. As the speed of the engine diminishes, the tension of the springs S S acts to restore the weights to their normal position.

I have thus represented several different forms in which my invention can be practically applied.

It is to be observed that a principal and meritorious feature of my invention is the screw-shaft, whose different sections are threaded at a different pitch, in connection with which shaft the centrifugally-acting devices operate.

It is likely that other variations of the invention may be made besides those that I have herein specifically described and illustrated. I therefore reserve the liberty of varying my invention as the exigencies of different cases may require and as experience may dictate and develop, and I do not wish to be confined to the precise arrangement shown in any one of the forms.

Having thus described my invention, what I claim as new, and desire to secure by Letters Patent, is—

1. The combination of the centrifugally-acting weights, a screw-shaft on which the weights are located and travel, and a valve-operating device likewise situated on the screw-shaft, substantially as described.

2. The combination of the centrifugally-acting weights, guides therefor, a screw-shaft which is engaged and rotated by said weights, and springs for restoring the weights to their normal position.

3. In an engine-governor, the combination of the centrifugally-acting weights, the screw-shaft whose sections are of different pitch, said shaft being engaged and rotated by the weights, and a block situated on the shaft and which is actuated by the rotation of the shaft, substantially as described.

4. In an engine-governor, the combination of centrifugally-acting weights, a screw-shaft on which said weights are located, the sections of which screw-shaft are of different pitch, guideways on which the weights travel, springs for returning the weights to their normal position and mechanical cut-off devices operated by the screw-shaft, substantially as described.

5. In an engine-governor, the combination of centrifugally-acting weights, a governor-wheel having parallel guideways on which the weights travel, a central screw-shaft whose sections are of different pitch, said shaft having its sections of larger pitch passing through the weights, a block located on the central portion of the shaft which is of the smaller pitch and connections between the said block and the engine-valve, substantially as described.

6. In an engine-governor, the combination with the centrifugally-acting weights, of a screw-shaft whose threaded sections are of different pitch, the weights being located upon the sections of larger pitch, substantially as described.

7. In an engine-governor, the combination of the governor-wheel having parallel guideways, the weights moving on said guides, the screw-shaft whose sections are of different pitch, the springs connecting the ends of the weights, the block situated on the central section of the screw-shaft and movable by the rotation of said shaft and connecting rod or rods attached to said block, substantially as described.

8. In an engine-governor, the combination of the governor-wheel, the engine-shaft to which it is attached, the screw-shaft whose sections are of different pitch, the weights traveling on said screw-shaft, parallel guides for supporting the weights, screw-bearings at the end of the screw-shaft and suitable springs for restoring the weights to their normal position, substantially as described.

9. The combination of the weights, guides therefor, a screw-shaft engaged and turned by the weights, and a connection between said shaft and the valve.

10. The combination of the centrifugally-acting weights, guides therefor, a screw-shaft engaged and turned by the weights, and springs connecting the weights, substantially as described.

In testimony whereof I affix my signature in presence of two witnesses.

JOHN V. RICE, JR.

Witnesses.
OLIVER B. FINN,
FRED E. TASKER.